(12) United States Patent
Luo et al.

(10) Patent No.: US 11,754,770 B2
(45) Date of Patent: Sep. 12, 2023

(54) LIGHT GUIDE MODULE AND TOUCH DISPLAY DEVICE

(71) Applicant: TPK Touch Solutions (Xiamen) Inc., Fujian (CN)

(72) Inventors: Jian Xing Luo, Nanping (CN); Jian Bin Yan, Xianyou County (CN); Kai Lun Dai, Zhangzhou (CN); Zhang Zheng Yang, Sanming (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 86 days.

(21) Appl. No.: 17/586,335

(22) Filed: Jan. 27, 2022

(65) Prior Publication Data

US 2023/0236352 A1    Jul. 27, 2023

(51) Int. Cl.
  *G02B 6/00*    (2006.01)
  *F21V 8/00*    (2006.01)
  *G06F 3/041*   (2006.01)

(52) U.S. Cl.
  CPC ......... *G02B 6/0055* (2013.01); *G06F 3/0412* (2013.01)

(58) Field of Classification Search
  CPC .. G02B 6/0055; G02B 6/0061; G02B 6/0033; G02B 6/0036; G02B 6/0038; G02B 6/0043; G06F 3/0412; G02F 1/133615
  See application file for complete search history.

(56) References Cited

U.S. PATENT DOCUMENTS

| | | | | |
|---|---|---|---|---|
| 2004/0105249 | A1* | 6/2004 | Yu | G02B 6/0033 362/23.15 |
| 2008/0319715 | A1* | 12/2008 | Kim | G02B 6/0025 703/1 |
| 2017/0176667 | A1* | 6/2017 | Zhang | G02B 6/0016 |
| 2020/0326581 | A1 | 10/2020 | Miyao | |

FOREIGN PATENT DOCUMENTS

| | | |
|---|---|---|
| CN | 111505883 A | 8/2020 |
| TW | M585364 U | 10/2019 |
| TW | 202101088 A | 1/2021 |

* cited by examiner

*Primary Examiner* — Omar Rojas Cadima
(74) *Attorney, Agent, or Firm* — Cooper Legal Group, LLC

(57) ABSTRACT

A light guide module includes a cover plate, a light-shielding layer, a light guide plate, and at least one light source. The light-shielding layer is disposed under the cover plate and has a width less than about 4 mm. The light guide plate is disposed under the cover plate. The light guide plate has a reflective surface and a light-exiting surface opposite to each other, and a light-incident surface and three side surfaces connected between the reflective surface and the light-exiting surface. The light source is configured to emit light toward the light-incident surface. A surface roughness of the three side surfaces ranges from about 300 nm to about 400 nm, so that a change rate of brightness measured by any adjacent two of measuring points evenly distributed on the light-exiting surface is between about 8% and about 12%.

10 Claims, 2 Drawing Sheets

LIGHT GUIDE MODULE AND TOUCH DISPLAY DEVICE

BACKGROUND

Technical Field

The present disclosure relates to a light guide module and a touch display device.

Description of Related Art

At present, in the display module industry, especially in the consumer field, the bezel of the display control module has a trend of getting smaller and smaller. A narrow bezel can bring better display effect and a more shocking appearance design, which can create greater product value for end customers.

However, when the bezel of a display module is reduced, the visible area of the display module becomes closer to the edge of the light guide plate. Therefore, compared to a conventional display module that does not adopt the narrow bezel architecture, the display module that adopts the narrow bezel architecture is prone to light leakage at the edge of the visible area, which affects the display effect. Although there is prior art that teaches that the optical effect can be improved by increasing the surface roughness of the edges of the light guide plate, the prior art still cannot solve the problem of light leakage in the visible area of the display module using the narrow bezel architecture.

Accordingly, how to provide a light guide module and a touch display device to solve the aforementioned problems has become an important issue to be solved by those in the industry.

SUMMARY

An aspect of the disclosure is to provide a light guide module and a touch display device that can efficiently solve the aforementioned problems.

According to an embodiment of the disclosure, a light guide module includes a cover plate, a light-shielding layer, a light guide plate, and at least one light source. The light-shielding layer is disposed under the cover plate and has a width less than about 4 mm. The light guide plate is disposed under the cover plate. The light guide plate has a reflective surface and a light-exiting surface opposite to each other, and a light-incident surface and three side surfaces connected between the reflective surface and the light-exiting surface. The light source is configured to emit light toward the light-incident surface. A surface roughness of the three side surfaces ranges from about 300 nm to about 400 nm, so that a change rate of brightness measured by any adjacent two of measuring points evenly distributed on the light-exiting surface is between about 8% and about 12%.

In an embodiment of the disclosure, the change rate is smaller than about 10%.

In an embodiment of the disclosure, the measuring points are composed of a plurality of point groups. The measuring points in each of the point groups are arranged equidistantly along a dimension.

In an embodiment of the disclosure, adjacent two of the measuring points of one of the point groups are separated by a gap. One of the measuring points of the one of the point groups is separated from an edge of the light-exiting surface by a distance in the dimension. The distance is smaller than the gap.

In an embodiment of the disclosure, the gap is twice the distance.

In an embodiment of the disclosure, the point groups are arranged equidistantly along another dimension.

In an embodiment of the disclosure, the measuring points are arranged based on an array composed of two dimensions.

In an embodiment of the disclosure, the array is a matrix.

In an embodiment of the disclosure, a number of the at least one light source is plural. Any adjacent two of the light sources are separated by a gap. The light guide plate defines thereon a visible area within an inner boundary of the light-shielding layer. The light sources are separated from the visible area by a distance. A ratio of the distance to the gap is between about 0.6 and about 2.0.

According to an embodiment of the disclosure, a touch display device includes the light guide module, a reflective display, and a touch layer. The reflective display is disposed under the light guide plate. The light-exiting surface faces the reflective display. The touch layer is disposed between the cover plate and the light guide plate.

Accordingly, in the light guide module and the touch display device of the present disclosure, the light-shielding layer has a width less than about 4 mm, and therefore the light guide module and the touch display device belong to the narrow bezel architecture. By making the surface roughness of the side surfaces of the light guide plate range from about 300 nm to about 400 nm, the diffusion and reflection of the light propagating in the light guide plate at the edges can be reduced, so that the brightness of the light emitted from the entire light-exiting surface of the light guide plate is more uniform without local bright spots. In this way, the problem of light leakage at the edges of the visible area can be effectively solved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
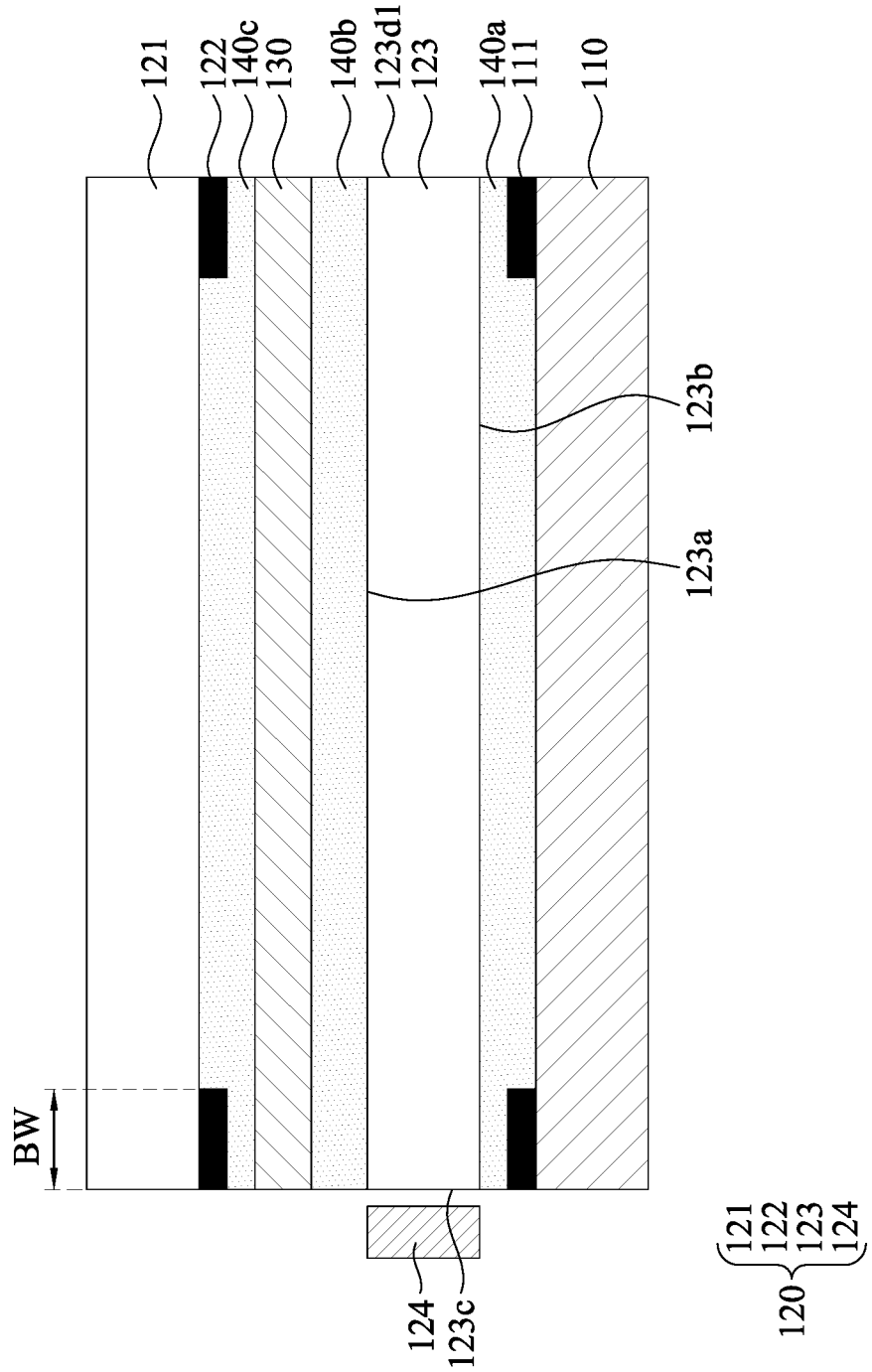
FIG. 1 is a schematic diagram of a touch display device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
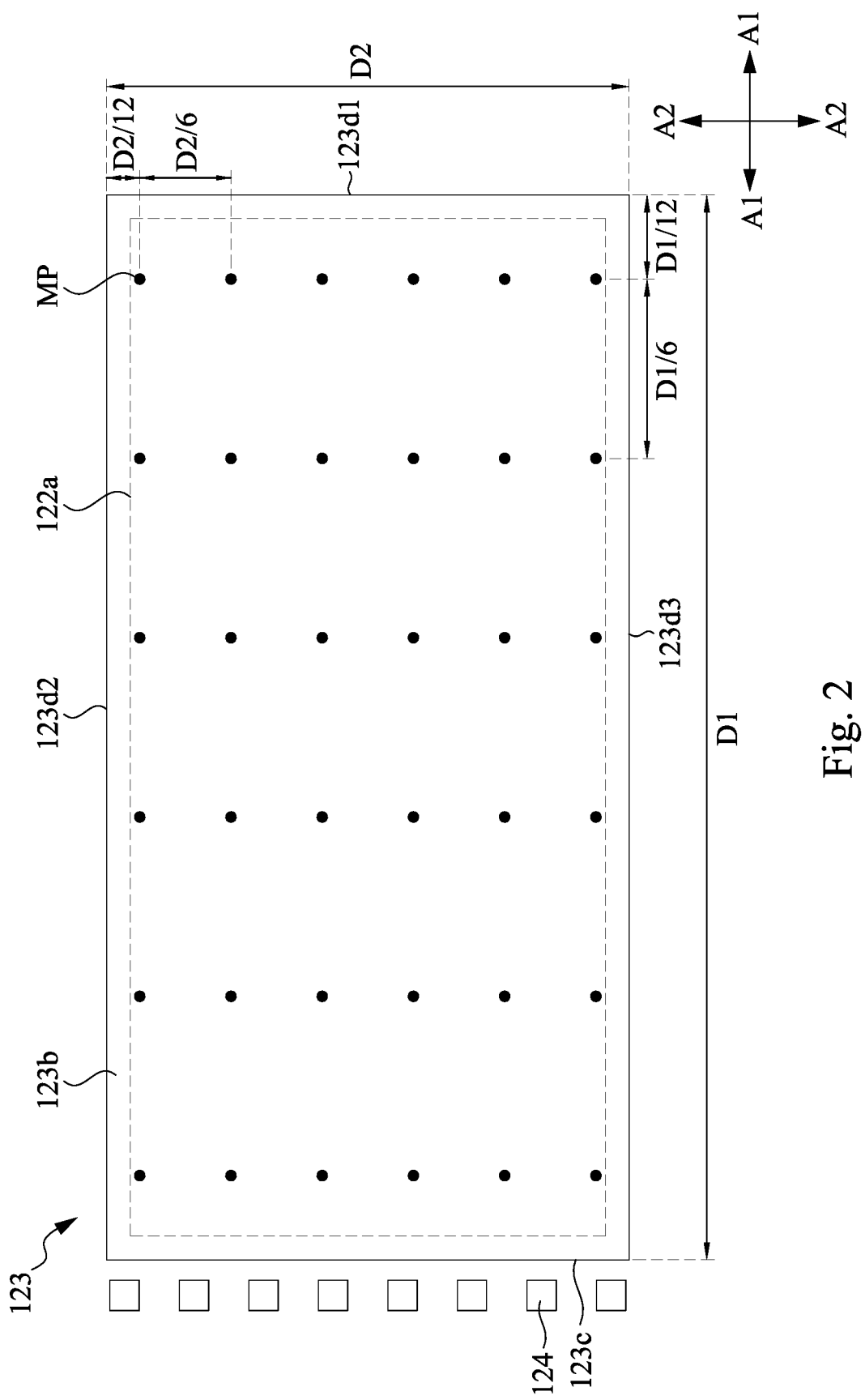
FIG. 2 is a top view of some components of the touch display device in FIG. 1.

Reference is made to FIGS. 1 and 2. FIG. 1 is a schematic diagram of a touch display device 100 according to an embodiment of the present disclosure. FIG. 2 is a top view of some components of the touch display device 100 in FIG. 1. As shown in FIGS. 1 and 2, in the present embodiment, the touch display device 100 includes a light guide module 120. The light guide module 120 includes a cover plate 121, a light-shielding layer 122, a light guide plate 123, and a plurality of light sources 124. The light-shielding layer 122 is disposed under the cover plate 121. The light guide plate 123 is disposed under the cover plate 121. The light guide plate 123 has a reflective surface 123a and a light-exiting surface 123b opposite to each other, and a light-incident surface 123c and three side surfaces 123d1, 123d2, 123d3 connected between the reflective surface 123a and the light-exiting surface 123b. The light guide plate 123 defines thereon a visible area VA within an inner boundary 122a of the light-shielding layer 122 (indicated by a dotted line in FIG. 2). The light sources 124 are configured to emit light toward the light-incident surface 123c. Hence, the light entering the light guide plate 123 from the light-incident surface 123c can propagate in the light guide plate 123, in which the light reaching the reflective surface 123a will be reflected based on the principle of total internal reflection, and the light reaching the light-exiting surface 123b can leave the light guide plate 123 when the light does not meet the condition of total internal reflection.

In some embodiments, the light sources 124 are light-emitting diodes, but the disclosure is not limited in this regard.

As shown in FIG. 1, in the present embodiment, the touch display device 100 further includes a reflective display 110 and a touch layer 130. The reflective display 110 is disposed under the light guide plate 123 of the light guide module 120. The light-exiting surface 123b of the light guide plate 123 faces the reflective display 110. The touch layer 130 is disposed between the cover plate 121 and the light guide plate 123 of the light guide module 120. For example, the reflective display 110 and the light guide plate 123 may be bonded through an adhesive layer 140a, the light guide plate 123 and the touch layer 130 may be bonded through an adhesive layer 140b, and the touch layer 130 and the cover plate 121 may be bonded through an adhesive layer 140c, but the disclosure is not limited in this regard.

In some embodiments, another light-shielding layer 111 may be provided on the reflective display 110, and the light-shielding layer 111 may be opposite to the light-shielding layer 122 up and down, but the disclosure is not limited in this regard.

According to the foregoing configurations, the light emitted by the light sources 124 is first guided to the reflective display 110 below via the light guide plate 123, and then is reflected by the reflective display 110. Hence, a user can view a specific image reflected by the reflective display 110 sequentially through the cover plate 121, the touch layer 130, and the light guide plate 123. In addition, a touch operation of the user on the cover plate 121 can be sensed by the touch layer 130, so the touch layer 130 implements a touch sensing function in the touch display device 100.

In some embodiments, the reflective display 110 is a reflective liquid crystal display, but the disclosure is not limited in this regard.

In some embodiments, the touch layer 130 includes a metal grid, an indium tin oxide (ITO) electrode layer, or a silver nanowire electrode layer, but the disclosure is not limited in this regard. The touch layer 130 adopting the aforementioned structure or material can have a higher light transmittance, so that the user can clearly see the specific image reflected by the reflective display 110.

As shown in FIGS. 1 and 2, in the present embodiment, the light-shielding layer 122 has a frame shape and has a width BW less than about 4 mm. In other words, the touch display device 100 of the present embodiment belongs to the narrow bezel architecture. For example, the touch display device 100 may have a bezel of about 8.4 mm and three bezels of about 3.4 mm, but the disclosure is not limited in this regard.

Furthermore, in the present embodiment, a surface roughness of the side surfaces 123d1, 123d2, 123d3 ranges from about 300 nm to about 400 nm, so that a change rate of brightness measured by any adjacent two of measuring points MP evenly distributed on the light-exiting surface 123b is between about 8% and about 12%. In some embodiments, the change rate of brightness is preferably smaller than about 10%.

It should be noted that the current existing technology mainly uses a die cut process to cut the edges of the light guide plate 123. However, the surface roughness of the edges cut by this process is relatively large (for example, about 3,391 nm). After optical inspection, the Applicant found that the excessive surface roughness is the main cause of light leakage in the visible area of a display module with the narrow bezel architecture.

Therefore, the Applicant proposes to further reduce the surface roughness of the side surfaces 123d1, 123d2, 123d3 of the light guide plate 123 to a specific range in the present embodiment to reduce the diffusion and reflection of the light propagating in the light guide plate 123 at the edges, so that the brightness of the light emitted from the entire light-exiting surface 123b of the light guide plate 123 is more uniform without local bright spots.

In some embodiments, the surface roughness of the side surfaces 123d1, 123d2, 123d3 of the light guide plate 123 may be further reduced by, for example, a polishing process, but the disclosure is not limited in this regard.

In some embodiments, white light interferometry (WLI) may be used to measure the brightness at the measuring points MP. The WLI is a non-contact three-dimensional optical measuring instrument, which is one of the optical profilers (OP), and can perform sample roughness analysis. The main principle of the WLI is to pass the light reflected by the object and the light reflected from the reference surface through a beam splitter by using the low coherence characteristics of white light to generate interference waves, and obtain the surface topography height from the phase difference.

In some embodiments, the measuring points MP are composed of a plurality of point groups. The measuring points MP in each of the point groups are arranged equidistantly along a dimension. For example, as shown in FIG. 2, in the present embodiment, the measuring points MP are composed of six point groups, in which the measuring points MP in each of the point groups are arranged equidistantly along a first dimension A1, and the six point groups are arranged equidistantly in a second dimension A2. Adjacent two of the measuring points MP of one of the point groups (e.g., the point group in the bottom row) are separated by a gap G1. One of the measuring points MP of the one of the point groups is separated from an edge of the light-exiting surface 123b (e.g., the edge formed by the side surface 123d1) by a distance D1 in the first dimension A1. The distance D1 is smaller than the gap G1.

In some embodiments, the gap G1 is twice the distance D1, but the disclosure is not limited in this regard. In other words, if an edge formed by the side surface 123d3 has a length L1 and the aforementioned point group has six measuring points MP, the gap G1 between any adjacent two of the measuring points MP is one sixth of the length L1, and the distance D1 is one twelfth of the length L1.

As shown in FIG. 2, in the present embodiment, the measuring points MP may be composed of other six point groups, in which the measuring points MP in each of the point groups are arranged equidistantly along the second dimension A2, and the six point groups are arranged equidistantly in the first dimension A1. Adjacent two of the measuring points MP of one of the point groups (e.g., the point group in the rightmost column) are separated by a gap G2. One of the measuring points MP of the one of the point groups is separated from an edge of the light-exiting surface 123b (e.g., the edge formed by the side surface 123d2) by a distance D2 in the second dimension A2. The distance D2 is smaller than the gap G2.

In some embodiments, the gap G2 is twice the distance D2, but the disclosure is not limited in this regard. In other words, if an edge formed by the side surface 123d1 has a length L2 and the aforementioned point group has six measuring points MP, the gap G2 between any adjacent two of the measuring points MP is one sixth of the length L2, and the distance D2 is one twelfth of the length L2.

In the present embodiment, the measuring points MP are arranged based on an array composed of the first dimension A1 and the second dimension A2. In the present embodiment, the array is a matrix (i.e., the first dimension A1 and the second dimension A2 are perpendicular to each other). For example, the measuring points MP of the present embodiment form a 6 by 6 matrix. In practical applications, the measuring points MP may be adjusted to a 4 by 9 matrix based on a wider visible area VA.

As shown in FIG. 2, in the present embodiment, any adjacent two of the light sources 124 are separated by a gap G3. The light sources 124 and the visible area VA are separated by a distance D3. The ratio of the distance D3 to the gap G3 is about 0.6 to about 2.0. When the ratio is less than 0.6, the brightness of the light emitted from the light-exiting surface 123b of the light guide plate 123 may be insufficient. When the ratio is greater than 2.0, not only the overall cost will increase with the increase in the number of light sources 124, but the increase in the number of traces of the light sources 124 may also exceed the allowable limit of the bezel. Therefore, within the aforementioned ratio range of the distance D3 and the gap G3, the touch display device 100 adopting the narrow bezel architecture can achieve a good balance between brightness and cost.

According to the foregoing recitations of the embodiments of the disclosure, it can be seen that in the light guide module and the touch display device of the present disclosure, the light-shielding layer has a width less than about 4 mm, and therefore the light guide module and the touch display device belong to the narrow bezel architecture. By making the surface roughness of the side surfaces of the light guide plate range from about 300 nm to about 400 nm, the diffusion and reflection of the light propagating in the light guide plate at the edges can be reduced, so that the brightness of the light emitted from the entire light-exiting surface of the light guide plate is more uniform without local bright spots. In this way, the problem of light leakage at the edges of the visible area can be effectively solved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light guide module, comprising:
a cover plate;
a light-shielding layer disposed under the cover plate and having a width less than about 4 mm;
a light guide plate disposed under the cover plate, the light guide plate having a reflective surface and a light-exiting surface opposite to each other, and a light-incident surface and three side surfaces connected between the reflective surface and the light-exiting surface; and
at least one light source configured to emit light toward the light-incident surface,
wherein a surface roughness of the three side surfaces ranges from about 300 nm to about 400 nm, so that a change rate of brightness measured by any adjacent two of measuring points evenly distributed on the light-exiting surface is between about 8% and about 12%.

2. The light guide module of claim 1, wherein the change rate is smaller than about 10%.

3. The light guide module of claim 1, wherein the measuring points are composed of a plurality of point groups, and the measuring points in each of the point groups are arranged equidistantly along a dimension.

4. The light guide module of claim 3, wherein adjacent two of the measuring points of one of the point groups are separated by a gap, one of the measuring points of the one of the point groups is separated from an edge of the light-exiting surface by a distance in the dimension, and the distance is smaller than the gap.

5. The light guide module of claim 4, wherein the gap is twice the distance.

6. The light guide module of claim 3, wherein the point groups are arranged equidistantly along another dimension.

7. The light guide module of claim 1, wherein the measuring points are arranged based on an array composed of two dimensions.

8. The light guide module of claim 7, where the array is a matrix.

9. The light guide module of claim 1, wherein a number of the at least one light source is plural, any adjacent two of the light sources are separated by a gap, the light guide plate defines thereon a visible area within an inner boundary of the light-shielding layer, the light sources are separated from the visible area by a distance, and a ratio of the distance to the gap is between about 0.6 and about 2.0.

10. A touch display device, comprising:
the light guide module of claim 1;
a reflective display disposed under the light guide plate, wherein the light-exiting surface faces the reflective display; and
a touch layer disposed between the cover plate and the light guide plate.

* * * * *